(12) United States Patent
Plattner et al.

(10) Patent No.: US 11,256,718 B2
(45) Date of Patent: Feb. 22, 2022

(54) DATA PLACEMENT IN HYBRID DATA LAYOUTS FOR TIERED HTAP DATABASES

(71) Applicant: Hasso-Plattner-Institut für Digital Engineering gGmbH, Potsdam (DE)

(72) Inventors: Hasso Plattner, Schriesheim (DE); Matthias Uflacker, Berlin (DE); Martin Boissier, Berlin (DE); Rainer Schlosser, Berlin (DE)

(73) Assignee: Hasso-Plattner-Institut für Digital Engineering gGmbH, Potsdam (DE)

( * ) Notice: Subject to any disclaimer, the term of this patent is extended or adjusted under 35 U.S.C. 154(b) by 352 days.

(21) Appl. No.: 16/364,869

(22) Filed: Mar. 26, 2019

(65) Prior Publication Data
US 2019/0294615 A1 Sep. 26, 2019

(30) Foreign Application Priority Data
Mar. 26, 2018 (EP) .................................. 18164052

(51) Int. Cl.
| | |
|---|---|
| G06F 16/27 | (2019.01) |
| G06F 16/21 | (2019.01) |
| G06F 16/22 | (2019.01) |
| G06F 16/23 | (2019.01) |
| G06F 16/28 | (2019.01) |

(52) U.S. Cl.
CPC ............ *G06F 16/278* (2019.01); *G06F 16/21* (2019.01); *G06F 16/211* (2019.01); *G06F 16/212* (2019.01); *G06F 16/213* (2019.01); *G06F 16/217* (2019.01); *G06F 16/22* (2019.01); *G06F 16/221* (2019.01); *G06F 16/2282* (2019.01); *G06F 16/2386* (2019.01); *G06F 16/283* (2019.01)

(58) Field of Classification Search
CPC ......................... G06F 16/24542; G06F 16/284
USPC .................................. 707/999.002, 999.003
See application file for complete search history.

(56) References Cited

U.S. PATENT DOCUMENTS

| | | | |
|---|---|---|---|
| 8,572,063 B2 | 10/2013 | Plattner et al. | |
| 8,601,038 B2 | 12/2013 | Plattner et al. | |
| 8,756,686 B2 | 6/2014 | Plattner et al. | |
| 8,832,123 B2 | 9/2014 | Plattner et al. | |
| 8,832,145 B2 | 9/2014 | Plattner et al. | |
| 9,015,812 B2 | 4/2015 | Plattner et al. | |
| 9,256,839 B2 | 2/2016 | Plattner et al. | |
| 9,424,282 B2 | 8/2016 | Plattner et al. | |
| 9,424,332 B2 | 8/2016 | Plattner et al. | |

(Continued)

OTHER PUBLICATIONS

Extended European Search Report for EP Application 18164052.5 dated Sep. 20, 2018, 8 pages.

*Primary Examiner* — Baoquoc N To
(74) *Attorney, Agent, or Firm* — Fountainhead Law Group P.C.

(57) ABSTRACT

Computer-implemented method for allocating columns of a table stored in a database system into at least two sets of columns, a first set and a second set, the data of the columns allocated to the first set being stored on a primary storage medium using a column-oriented data structure and the data of columns allocated to the second set being stored on a secondary storage medium using a row-oriented data structure, wherein the method comprises the step of allocating the columns of the table to the first and the second set autonomously on the basis of a performance-cost model.

13 Claims, 9 Drawing Sheets

(56) References Cited

U.S. PATENT DOCUMENTS

| | | | |
|---|---|---|---|
| 9,542,424 B2 | 1/2017 | Plattner et al. | |
| 9,542,445 B2 | 1/2017 | Plattner et al. | |
| 9,626,421 B2 | 4/2017 | Plattner et al. | |
| 9,740,741 B2 | 8/2017 | Plattner et al. | |
| 10,089,142 B2 | 10/2018 | Plattner et al. | |
| 10,936,595 B2 * | 3/2021 | Zhou | G06F 16/24561 |
| 2008/0262890 A1 * | 10/2008 | Korupolu | G06F 11/0793 |
| | | | 705/7.22 |
| 2014/0012881 A1 * | 1/2014 | Roesch | G06F 16/217 |
| | | | 707/792 |
| 2014/0214793 A1 | 7/2014 | Tatemura et al. | |
| 2015/0178305 A1 * | 6/2015 | Mueller | G06F 16/221 |
| | | | 707/693 |
| 2015/0363167 A1 | 12/2015 | Kaushik | |
| 2017/0212934 A1 | 7/2017 | Plattner et al. | |
| 2019/0095486 A1 * | 3/2019 | Hopeman, IV | G06F 16/283 |

\* cited by examiner

DATA PLACEMENT IN HYBRID DATA LAYOUTS FOR TIERED HTAP DATABASES

CROSS REFERENCE TO RELATED APPLICATIONS

The present application claims priority to European Application No. 18 164 052.5 filed Mar. 26, 2018 for "Data Placement in Hybrid Data Layouts for Tiered HTAP Databases", which is incorporated herein by reference.

BACKGROUND

Field

The present disclosure relates to a method for allocating columns of a table stored in a database into at least two sets of columns, a first set and a second set, the data of the columns allocated to the first set being stored on a primary storage medium using a column-oriented data layout and the data of columns allocated to the second set being stored on a secondary storage medium using a row-oriented data layout. The present disclosure further relates to a database system configured to carry out such a method.

Description of Related Art

Many modern enterprise systems are no longer separated into traditional transaction-dominated systems and analytics-dominated data warehouses. Modern mixed workload (referred to as HTAP [hybrid transaction/analytical processing] or OLxP [online analytical/transaction processing]) systems are expected to handle transactional OLTP [online transaction processing] workloads as well as analytical OLAP [online analytical processing] workloads, both on a single system. It is argued which storage format is the best for mixed workloads. Columnar table layouts incur a large overhead for write-intensive OLTP workloads, especially inserts and wide tuple reconstructions, while performing well for analytical tasks. Row-oriented table layouts have shown to be insufficient for increasing analytical workloads of upcoming enterprise systems. Hence, commercial database vendors added columnar storage engines to their row stores.

To combine aspects of both worlds, in the related art, hybrid systems have been proposed that combine both row- and column orientation in a single storage engine and adjusting a table's layout depending on the workload. Many of these hybrid systems show improvements over pure row or column-oriented variants. But there are problems with these results for at least two reasons. First, most hybrid research prototypes evaluate the performance of hybrid structures against homogeneous layouts using the same execution engine. Hence, homogeneous implementations pay the price for hybrid data layouts that usually incur indirections and abstractions that affect database performance negatively. Second, well-known optimizations for homogeneous layouts (e.g., SIMD [single instruction, multiple data] for sequential operations) have not been fully exploited. Therefore, none of the proposed systems have proven yet that the advantages brought by hybrid designs justify the added complexity. The added complexity of a hybrid storage engine introduces new complexity in higher-level functionalities of the database since both, query optimization as well as query execution, have to deal with additional variables and uncertainty. It therefore remains questionable whether the gained flexibility is worth the added complexity that further impedes optimal decisions, e.g., during query plan building. While the overhead of hybrid abstractions and indirections can partially be mitigated by query compilation, the process of compiling efficient query plans for diverse data formats is highly sophisticated. The query optimizer's impact is often a factor 10 improvement while tuned runtime systems might bring 10% improvements.

It is an object of the present disclosure to provide an improved physical layout of hybrid databases and improved data eviction and loading (tiering). In particular, it is an object of the present disclosure to provide improved data eviction to a secondary storage medium without impacting performance for HTAP workload patterns. The benefits associated with such a hybrid database include a reduced primary storage footprint that can lower the costs for hardware, allow larger systems on a single server, improve elasticity, reduce recovery times, and allow for more memory-intensive algorithms to be executed.

SUMMARY

A first aspect of the present disclosure relates to a computer-implemented method in accordance with claim 1.

Such a computer implemented method can be used, for example, in a hybrid main memory-optimized database for mixed workloads in order to evict infrequently accessed data to a less expensive storage medium. It allows for adapting the overall storage layout to mitigate the negative performance impact of secondary storage. One of the key technical problems is to determine which data to place on which storage medium, which is solved by using a performance-cost model, which preferably is workload driven and which preferably takes reallocation costs into account.

A second aspect of the present disclosure relates to a database system in accordance with claim 13.

BRIEF DESCRIPTION OF DRAWING

The features of the disclosure are set forth with particularity in the appended claims. The disclosure itself, however, may be best understood by reference to the following detailed description of the disclosure, which describes exemplary embodiments of the disclosure and the underlying rationale, taken in conjunction with the accompanying drawings, in which:

DETAILED DESCRIPTION

In cooperation with attached drawings, the technical contents and detailed description of the present disclosure are described thereinafter according to example embodiments, being not used to limit its executing scope. Any equivalent variation and modification made according to appended claims is all covered by the claims claimed by the present disclosure.

The present disclosure relates a computer-implemented method for allocating columns of a table stored in a database into at least two sets of columns, a first set and a second set, the data of the columns allocated to the first set being stored on a primary storage medium (also referred to as primary storage) using a column-oriented data structure and the data of columns allocated to the second set being stored on a secondary storage medium (also referred to as secondary storage) using a row-oriented data structure, wherein the method comprises the step of allocating the columns of the table to the first and the second set autonomously on the basis of a performance-cost model. It further relates to a database system that is configured to carry out said method.

Preferably, on the basis of the performance-cost model, it is determined which columns have the smallest negative effect on performance when allocated to the second set (i.e., being added to an SSCG). Preferably, the utility (i.e., the expected performance) is determined by calculating the required data that needs to be processed. At first sight, this column allocation problem is related to the binary Knapsack problem: utility (i.e., the expected performance) is maximized for a given space constraint (i.e., the primary storage budget). But Knapsack approaches cannot be used to solve the column allocation problem at hand because the utility of having a column in primary storage typically depends on other column decisions (i.e., there is selection interaction). Therefore, the problem belongs to the class of resource allocation problems, which in general, must be solved using suitable solvers. An alternative and advantageous way of solving the present problem is subject of an embodiment described further below.

Figure 1:
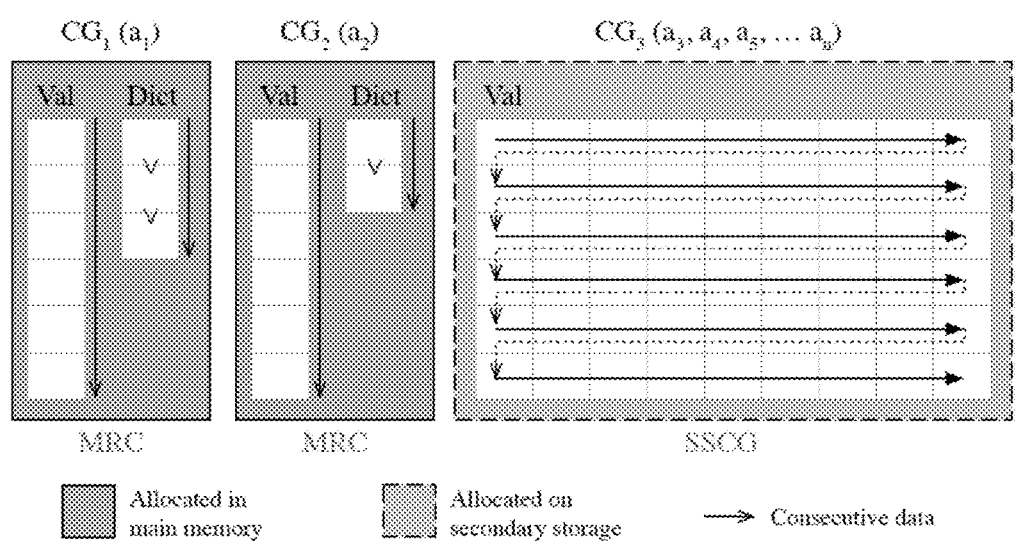
FIG. 1 shows an exemplary data layout for a database table, the data layout having three column groups (CG). The first two groups are both dictionary-encoded memory-resident columns (MRC). The remaining attributes are stored without any compression in a secondary storage column group (SSCG).

Preferably, to keep complexity manageable, only two data structures are used: (i) singular column groups (the first set) storing exactly one attribute and residing on a primary storage medium, such as DRAM [dynamic random access memory], and (ii) row-oriented column groups (the second set) that store attributes adjacent together and reside on secondary storage medium. An example data layout is depicted in FIG. 1. Preferably, attributes dominated by sequential reads are stored in the column-oriented data structure (which may be referred to as a Primary-Storage-Resident Column, PSRC, or, when the primary storage medium is DRAM, Memory-Resident Column, MRC). Advantageously, all or most sequential operations, e.g., filtering and joining, are executed on PSRCs. Preferably, the column-oriented data structure uses order-preserving dictionary encoding. Preferably, optimization techniques on PSRCs may be employed such as vectorization, SIMD, and processing compressed data with late materialization. For row-oriented column groups, it is to be noted that one of the most expensive operations for secondary-storage-resident column stores may be wide tuple reconstructions. For a table with 100 attributes, e.g., a full tuple reconstruction from a disk-resident and dictionary-encoded column store may typically require a read of at least 800 KB from disk (i.e., 100 accesses to both value vector and dictionary with 4 KB reads each). In contrast, row-oriented column groups (which may be referred to as a Secondary Storage Column Group, SSCG) are optimized for tuple-centred accesses, e.g., tuple reconstruction or probing.

Preferably, for performance reasons, SSCGs are stored uncompressed. This is a trade off between space consumption (assuming secondary storage layers are cheaper than the primary storage layer) and performance due to improved data locality for tuple accesses. But page-wise compression can alternatively be employed. Using the proposed SSCGs, full-width tuple reconstructions require only single 4 KB page accesses to secondary storage.

Preferably, tuple inserts, deletions, and updates are handled via a delta partition, which preferably resides on the primary storage medium. Consequently, attributes stored in an SSCG resemble disk resident row stores. This way, one can exploit both major advantages of row-oriented data structures: (1) comparatively easy eviction since a tuple's attributes are stored consecutively in one place; and (2) advantages for tuple reconstruction with perfect cache locality for point accesses. In contrast, PSRC-attributes resemble in-memory databases, such as SAP HANA or HyPer, which execute analytical/sequential operations on columnar dictionary-encoded attributes.

Preferably, queries against the table are executed using indices if existing. Preferably, query filters are sorted by increasing selectivity (attribute selectivity may be defined for equality predicates as 1/n for an attribute with n distinct values). With the introduction of SSCG-placed attributes, the only change is that filters on non-indexed columns are sorted first by the location (primary-storage-resident or not) and second by selectivity. The goal is to ensure fast query filtering via index accesses or scans on primary-storage-resident columns. The goal is to keep those columns in primary storage that are regularly used in sequential operations. In real life scenarios, many attributes are filtered in combination with highly restrictive attributes. Preferably, a query executor switches from scanning to probing as soon as the fraction of remaining qualifying tuples falls below a certain threshold (usually set to 0.01% of the table's tuple count). Probing a primary-storage-resident cell is still faster than accessing a 4 KB page from secondary storage, but the further the tuple probing is delayed, the higher the probability that the currently evaluated tuple is part of the result set. This way, piggyback probing during filtering is applied in order to load the remaining attributes in primary storage in case several projected attributes of the tuple are part of the result.

According to an embodiment, the method further comprises a preprocessing step of allocating all columns which have not been filtered at all to the second set.

According to an embodiment, the step of allocating the columns is carried out repeatedly and autonomously during operation of the database. But in case the database administrator has additional performance requirements, attributes can be manually pinned either to the first or the second set. For instance, the columns containing primary key attributes can be manually pinned to the first set in order to ensure sufficient transactional performance or to fulfil service-level agreements (SLAs) for particularly important processes (see FIG. 2).

According to an embodiment, the performance-cost model takes into account at least one of the following parameters: an execution time of a workload that the database has experienced during operation; and a total available space on the primary storage medium. Preferably, both parameters are taken into account.

Preferably, columns are allocated to the primary storage medium such that (i) the overall performance is maximized, i.e., a workload's execution time is minimized, and (ii) the total primary storage medium used does not exceed a given budget. A workload dependent performance-cost model is advantageous because, in real-life data tables, only a fraction of the attributes is accessed for filtering (i.e., selection). And many of the filtered columns are either (i) filtered very seldom or (ii) usually filtered in combination with other highly restrictive attributes. The negative impact of these columns not residing on primary storage can be negligible with an execution model that is aware of the interaction between attribute selectivity and placement. Therefore, attributes can often be separated into two sets: (i) columns that are accessed for table searches, aggregations, joins, and other sequential operations that favour columnar layouts; and (ii) remaining columns that are either never accessed or point-accessed, e.g., for tuple reconstruction or probing.

For setting up a performance-cost-model that is workload dependent, the workload of the database system is preferably characterized by N columns and Q queries. According to a preferred bandwidth-centric workload model, each query j is characterized by the set of columns $q_j \subseteq \{1, \ldots, N\}$, $j=1, \ldots, Q$ that are accessed during query evaluation. Preferably, all accesses are modelled as scans with a particular selectivity (e.g., OLAP joins and aggregations are large sequential accesses). The access costs of a query preferably depend on whether occurring columns are in primary storage. To indicate whether a column i is either stored in primary storage (1) or not (0), preferably binary decision variables $x_i$, $x_i \in \{0, 1\}$, $i=1, \ldots, N$ are used. The size of a column i in bytes may be denoted by $a_i$.

Preferably, the performance-cost model depends on total scan costs F. The total scan costs in turn may depend on the column allocation $\vec{x}:=(x_1, \ldots, x_N)$ and are defined by the sum of scan costs $f_j$ of all queries j multiplied by their number of occurrences $b_j$:

$$F(\vec{x}):=\Sigma_{j=1,\ldots,Q} b_j \cdot f_j(\vec{x})$$

According to an embodiment, the performance-cost model takes column interactions into account. Advantageously, this may significantly improve the solution quality over various simple heuristics. For tuple-based query evaluation in row stores (cf. Volcano model), vertical partitioning is usually approached by heuristics that count filtering frequencies and determine partitions accordingly. This is a feasible approach for tuple-based query evaluation in row-oriented databases as the execution of the first predicate automatically loads the tuple's remaining attributes. However, most HTAP databases are column stores, which execute predicates in a fundamentally different way. Here, predicates are (usually) ordered by their selectivity (with the most restrictive predicate executed first) and executed successively where each operator passes a list of qualifying positions. Due to the multiplicative selectivities of conjunctive predicates, the expected number of accesses decreases with each executed predicate. Hence, the effect of having frequently accessed columns in primary storage is reduced. It can be advantageous to store other columns in primary storage although they are less often filtered. For compiled query engines, operators are chained and process in a tuple-based manner and only load the next predicated attribute in case the previous (conjunctive) predicate evaluated as true. Both ways, with each successive filter, a smaller part of the following attribute is accessed. As a consequence, counting filter frequencies is not a fitting model to vertically partition relations in columnar execution engines. The problem to solve rather resembles the problem of index selection with index interaction.

Preferably, the database system executes attribute filters sequentially in ascending order of the attribute's selectivity. Consequently, the expected selectivity of each predicate depends on the other attributes in the query. According to a preferred performance-cost model (herein also referred to as the "model"), it is assumed that columns with lower selectivity are scanned first. Preferably, the model also accounts for the selectivity of columns that have been already scanned. The selectivity $S_i$ of column i, $i=1, \ldots, N$, is the average share of rows with the same attribute. Note, for simplicity one only defines selectivity for equi-predicates with uniform value distributions. The database system preferably estimates selectivities (using distinct counts and histograms when available) which are straightforward to implement in the model. Preferably, scan costs $f_j$ of query j, $j=1, \ldots, Q$, are described by $$f_j(\vec{x}) := \sum_{i \in q_j} (x_i \cdot c_{mm} + (1-x_i) \cdot c_{ss}) \cdot a_i \cdot \prod_{k \in q_j : s_k < s_i} s_k \quad (1)$$

where $c_{mm} > 0$ is a scan cost parameter for main memory; $c_{ss} > 0$ denotes the cost parameter for secondary storage. Both parameters can preferably be calibrated; they describe the time it takes to read data (e.g., seconds to read a gigabyte of data) and are used to calculate estimated runtimes. Typically, we have $c_{mm} < c_{ss}$. Given a column selection $\vec{x}:=(x_1, \ldots, x_N)$, the allocated space in primary storage required to store the main memory-resident data amounts to:

$$M(\vec{x}):=\Sigma_{i=1,\ldots,N} a_i \cdot x_i$$

The solution to the performance-cost model preferably provides pareto-optimal solutions in view of performance-cost on the one side and consumption of the primary storage medium on the other side. The model can be solved in various ways. For instance, it can be solved using a solver, which is described in the following:

Step 1: Initial Optimization Problem: The problem is to minimize total scan costs such that the primary storage used does not exceed a given budget A, i.e., we consider the objective:

$$\underset{x_i \in [0,1], i=1,\ldots,N}{\text{minimize}} \ F(\vec{x}) \quad (2)$$

$$\text{subject to } M(\vec{x}) \leq A \quad (3)$$

As we avoided conditional expressions in the definitions of scan costs and the primary storage used the integer problem (2)-(3) is linear, and thus can be solved using standard integer solvers.

Step 2: Relaxation of Variables: We model problem (2)-(3) as a continuous linear problem, i.e., We allow the variables $x_i$, i=1, . . . , N, to take continuous values between 0 and 1:

$$\underset{x_i \in [0,1], i=1,\ldots,N}{\text{minimize}} \ F(\vec{x}) \quad (4)$$

The relaxed problem (4) with (3) can be solved using standard solvers. However, the solution is not necessarily of integer type. In Step 3, we use a reformulation of (4) and (3) to guarantee admissible integer solutions in a continuous framework.

Step 3: Penalty Formulation of Size Constraint: We omit constraint (3) and include a penalty term in the objective (4) for the primary storage space used:

$$\underset{x_i \in [0,1], i=1,\ldots,N}{\text{minimize}} \ F(\vec{x}) + \alpha \cdot M(\vec{x}) \quad (5)$$

The penalty parameter $\alpha$ is assumed to be non-negative. The new problem (5) has the following fundamental property.

Lemma 1. For all $\alpha$ the solution of the continuous linear problem formulation (5) is guaranteed to be integer.

Proof. The isoquants of objective (5) form a hyperplane. Minimizing the linear objective (5) corresponds to the point in which the best hyperplane touches the feasible region (for $\vec{x}$). Hence, a corner of the feasible region (an N-dimensional cube) is always part of an optimal solution. Since all corners have integer coordinates (total unimodularity of the constraint matrix) an optimal solution of integer type is guaranteed.

Note, the optimal (integer) solution of (5) depends on the penalty parameter $\alpha$. The higher $\alpha$, the lower is the primary storage space used by an optimal solution. While for $\alpha=0$ (no penalty) all columns are in primary storage, for $\alpha \to \infty$, no column is selected at all. Hence, $\alpha$ can be chosen such that the associated column selection $\vec{x}=\vec{x}(\alpha)$ just satisfies the budget constraint (3).

The inventors have applied the integer and continuous solution approaches to the workload and data of the BSEG table of a production SAP ERP system (overall 20,000 plans, 60 for BSEG). Without loss of generality, the inventors have used $A=A(w):=w \cdot \Sigma_{i=1,\ldots,N} a_i$, where w, $w \in [0, 1]$, is the relative memory budget. By "relative performance" is defined as the minimal scan costs (where all columns reside on the primary storage) divided by the scan costs $F(\vec{x})$ of a specific solution $\vec{x}$ as defined in (1)-(2).

Figure 3:
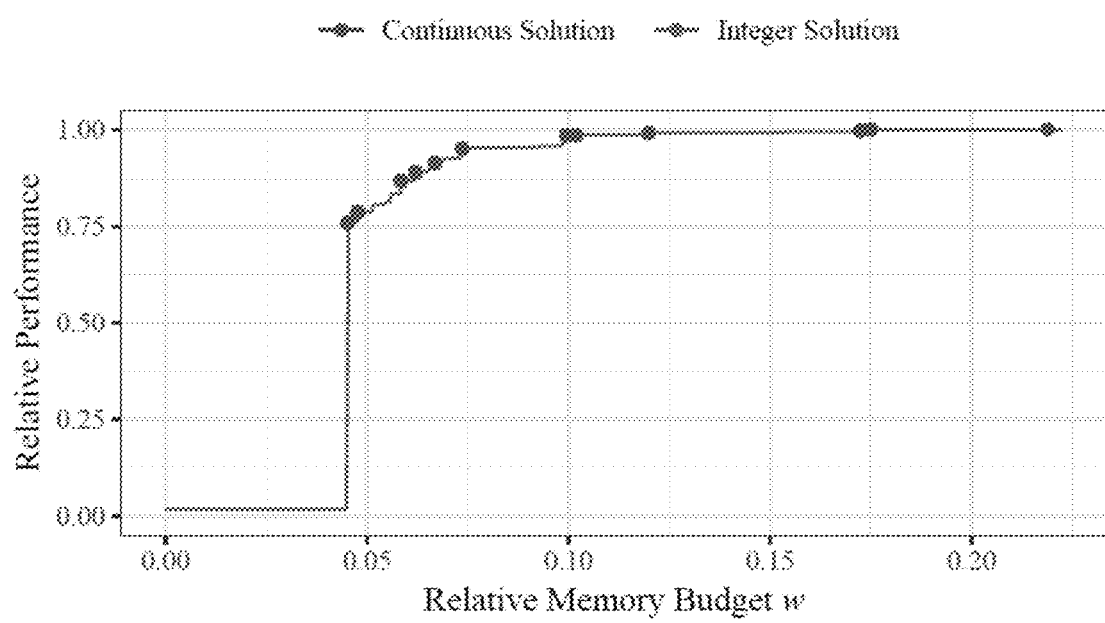
FIG. 3 is a graph that shows comparison of optimal integer and continuous solutions for BSEG table: Different combinations of relative performance and data loaded in primary storage.

FIG. 3 illustrates solutions of the integer and the continuous model for different memory budgets w. The more primary storage is allowed, the higher relative performance. An initial eviction rate of of over 78% is achieved solely by allocating columns that, according to the historic workload, have not been used to the second set. The remaining 22% are allocated on the basis of the continuous and the integer solution. The workload of the BSEG heavily relies on one of the largest columns called BELNR. The sudden drop of performance for eviction rates over 95% is caused by the fact that BELNR no longer fits into the memory budget. According to our model, sequential accesses are slowed down by less than 25% for eviction rates of up 95%. Note, the integer formulation, cf. problem (2)-(3), allows identifying optimal combinations of performance and primary storage budgets. These combinations cannot be dominated by others and hence, form a "Pareto-efficient frontier" (cf. FIG. 3).

Using different penalty parameters $\alpha$, the continuous problem formulation (5) allows for identifying feasible combinations of performance and primary storage budgets used, which are also efficient.

Theorem 1. For all $\alpha>0$ the solutions of the continuous problem (5) are part of the efficient frontier, which is characterized by optimal solutions of the integer problem (2)-(3) for different DRAM budgets A. Hence, they are Pareto-efficient. Proof. For an arbitrary but fixed penalty $\alpha>0$ let $\vec{x}^*=\vec{x}^*(\alpha)$ be an optimal solution of the continuous problem (5). It follows that $\vec{x}^*$ is also an optimal solution of the continuous problem (4) subject to (3) with budget $A:=A(\alpha):=M(\vec{x}^*(\alpha))$, since a better solution $\vec{x}$ of (4) st. (3) with $F(\vec{x})<F(\vec{x}^*)$ and $M(\vec{x}) \leq M(\vec{x}^*)$ would imply that $\vec{x}^*$ is not optimal for (5). Further, let $\vec{x}^*_{int}=\vec{x}^*_{int}(\alpha)$ be an optimal solution of the integer problem (2) subject to (3) with the same budget $A:=A(\alpha):=M(\vec{x}^*(\alpha))$. It follows that $F(\vec{x}^*_{int}) \geq F(\vec{x}^*)$ since the feasible space in problem (5) dominates the feasible space in problem (2), i.e., $\{0, 1\}^N \subseteq [0, 1]^N$. Further, Lemma 1 implies that $\vec{x}^*$ is of integer type and thus, an admissible candidate for problem (2) with budget $A:=M(\vec{x}^*)$. It follows $F(\vec{x}^*_{int})=F(\vec{x}^*)$. Finally, $M(\vec{x}^*_{int})<M(\vec{x}^*)$ is not possible as $F(\vec{x}^*_{int})+\alpha \cdot M(\vec{x}^*_{int})<F(\vec{x}^*)+\alpha \cdot M(\vec{x}^*)$ would imply that $\vec{x}^*_{int}$ is a better solution to (5) than $\vec{x}^*$, which is a contradiction. Consequently, we also have $M(\vec{x}^*_{int})=M(\vec{x}^*)$.

Advantageously, allocating columns in accordance with the embodiments disclosed herein is superior to simple heuristics. We consider a general scalable class of reproducible column selection problems. The considered heuristics are greedy approaches, which resemble the status quo for vertical partitioning models. Three heuristics are considered, which assess attributes by (i) the selection frequency, (ii) by selectivity, and by weighing selectivity and size of each attribute. The assessment of attributes is motivated by LRU [least recently used] approaches and the used metric to build the eviction order.

Example 1

We consider N columns, Q queries, and randomized parameter values. We compare optimal integer solutions (cf. (2)-(3)) solutions of the continuous model (cf. (5)) as well as allocations of the following three benchmark heuristics: (H1) Include columns in primary storage that are most used (in descending order), measured by the number of occurrences $g_i$, where $$g_i := \sum_{j=1,\ldots,Q, i \in q_j} b_j, i = 1, \ldots, N.$$

Figure 4:
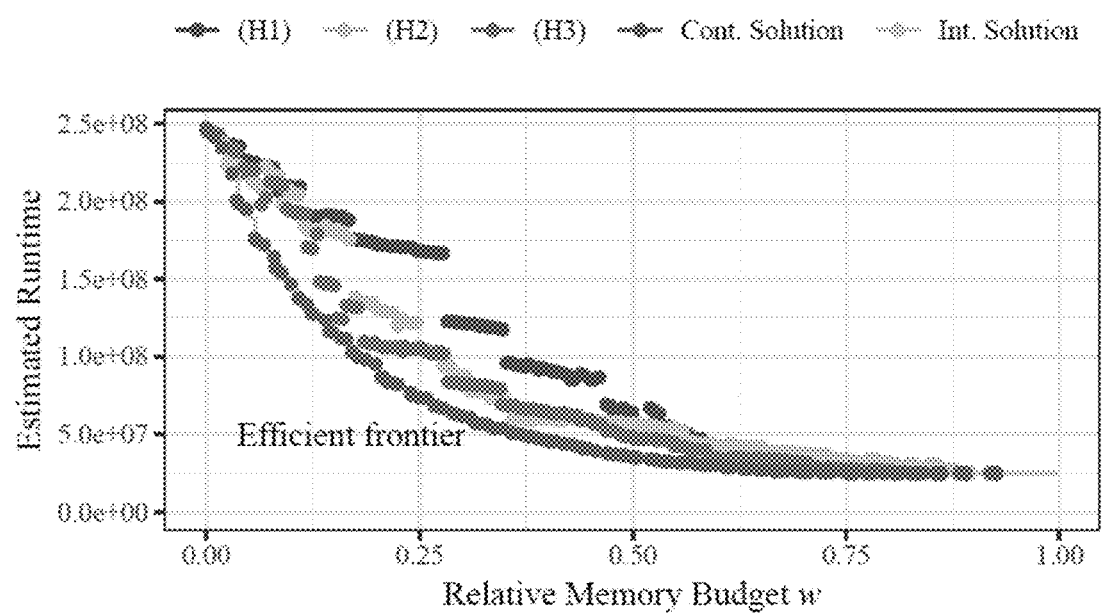
FIG. 4 is a graph that shows estimated runtime comparison of integer and continuous approach vs. heuristics (H1)-(H3) for Example 1.

(H2) Include columns in primary storage that have the smallest selectivity $s_i$, i=1, ..., N, (in ascending order). (H3) Include columns in primary storage that have the smallest ratio of selectivity and number of occurrences, i.e., $s_i/g_i$, i=1, ..., N, (in ascending order). If a column does not fit into the primary storage budget anymore, it is checked if columns of higher order do so. In all heuristics, columns which are not used at all ($g_i$=0) are not considered. We solve Example 1 for different primary storage budgets A(w). We consider N=50 columns and Q=500 queries. We apply the integer and the continuous solution approach as well as the heuristics (H1)-(H3). FIG. 4 illustrates different admissible combinations of estimated runtime and associated relative primary storage budget w for the different column selection strategies.

Figure 5:
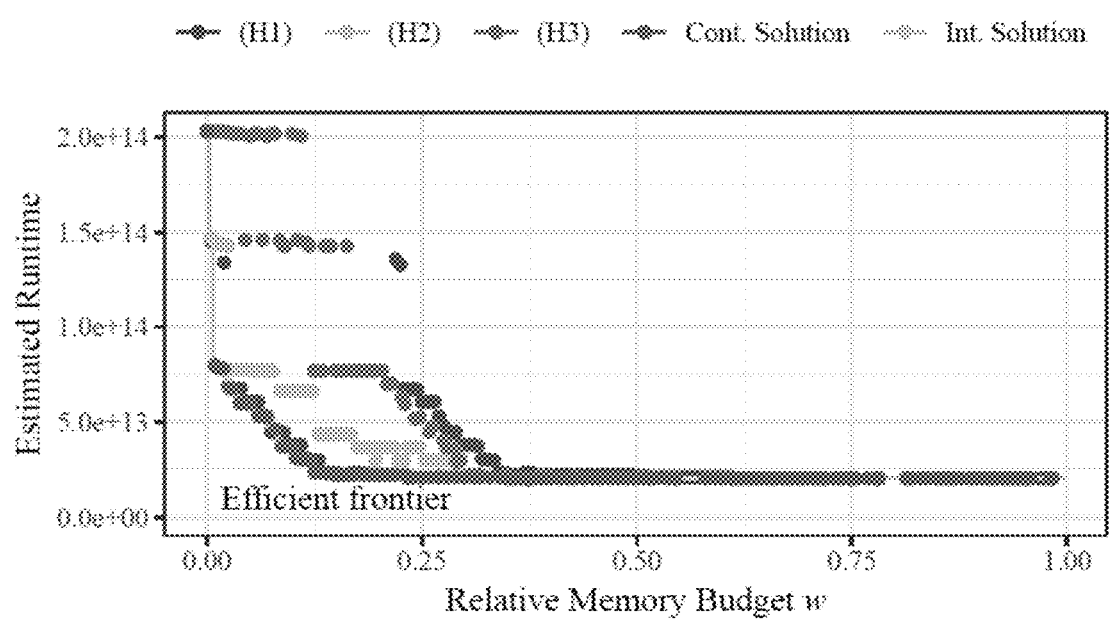
FIG. 5 is a graph that shows the estimated runtime comparison of integer/continuous approach vs. heuristics (H1)-(H3) for the BSEG table of the traced enterprise system.

The solutions of the integer problem form the efficient frontier. The solutions of the continuous problem are again part of the efficient frontier. We observe that both our approaches outperform all three heuristics (H1)-(H3). Depending on the primary storage budget, performance is up to 3× better. In general, the heuristics (H1)-(H3) are reasonable heuristics. In Example 1, some columns are more often included in queries. Hence, on average, the corresponding $g_i$ values are higher. Moreover, in our example, $g_i$ and selectivity $s_i$ are slightly negatively correlated. This explains why pure heuristics like (H1) and (H2) are suboptimal. Heuristic (H3) achieves better performance results as both effects are taken into account. However, those results are still far from optimal, because more complex effects, such as selection interactions are not taken care of. As in real-life workloads, in our example, some columns often occur in queries simultaneously. Hence, it is advisable just to select some of them to be in primary storage. The inventor's model-based solution yields better results because all complex effects are taken into account. Example 1 can be used to study the performance of heuristics for various workload characteristics. For special cases, rule-based heuristics may perform well. As soon as selection interaction becomes a factor, however, only advanced approaches can lead to good results. Note, that in real-life settings, workloads are typically of that complex type. In this context, FIG. 5 shows the performance results for the BSEG table (see Section III-B). We observe, that the interaction between selectivity and the number of accesses even leads to an (up to 10×) worse performance of the heuristics. It is unlikely that simple heuristics exist that fit all scenarios. This is due to the unforeseeable character of a workload which is characterized by the complex interplay of the quantities $b_j$, $g_i$, $s_i$, and $a_i$ as well as further important effects such as selection interaction or the structure of queries qi. Hence, an effective allocation strategy will have to find complex customized solutions (in a reasonable amount of time) that take all these effects simultaneously into account. Note that solutions to the continuous model are of that particular type as they are guaranteed to be efficient in any setting.

According to an embodiment, the performance-cost model further takes into account costs for reallocating columns. This is advantageous because an import aspect for real-life settings are reallocation costs. As workloads typically change over time, current data placements have to be recalculated regularly. However, reorganizations of data allocations are costly and time-consuming. The challenge is to identify reallocations that have a significant impact on performance compared to their costs.

A current column allocation $y_i \in \{0, 1\}$, i=1, ..., N, and a cost parameter ß for changing the memory location of a column (from secondary storage to primary storage or vice versa). We extend model (5) to minimize total scan costs, primary storage space used, and memory changes made:

$$\underset{x_i \in [0,1], i=1,\ldots,N}{\text{minimize}} F(\vec{x}) + \alpha \cdot M(\vec{x}) + \beta \cdot \sum_{i=1,\ldots,N} a_i \cdot |x_i - y_i| \quad (6)$$

Due to reallocation costs, the objective of the problem becomes nonlinear. To linearize (6), we introduce additional variables $z_i$, i=1, ..., N, which are continuous on [0, 1]. Further, we add two families of linear constraints such that problem (6) can be equivalently rewritten as:

$$\underset{x_i, z_i \in [0,1], i=1,\ldots,N}{\text{minimize}} F(\vec{x}) + \alpha \cdot M(\vec{x}) + \beta \cdot \sum_{i=1,\ldots,N} a_i \cdot z_i \quad (7)$$

subject to $x_i - y_i \leq z_i$, i = 1, ..., N $y_i - x_i \leq z_i$, i = 1, ..., N The new constraints guarantee that $z_i = |x_i - y_i|$ for all i. Further, as the total unimodularity of the constraint matrix is still satisfied integer solutions of (7) and thus of (6) are guaranteed. In practice, ß is selected depending on the system's requirements. In most cases, physical data maintenance is executed during night times. In this context, the numbers $b_j$ should be normalized on a daily basis and ß=1 may serve as a reference case. We can obtain the expected maintenance duration (usually bound by the secondary storage bandwidth) and adjust B accordingly so that we only initiate reallocations that will finish within the allowed maintenance time frame.

According to an embodiment, the step of allocating the columns comprises the step of: iteratively adding columns to the first set so that, in each iteration, a column is added to the first set that
has not been added in a previous iteration and that,
in accordance with the performance-cost-model, provides the largest performance gain per occupied space on the primary storage medium if it is added to the first set.

According to an embodiment, the step of assigning the columns further comprises the step of: if the column that
has not been added in a previous iteration and that,
in accordance with the performance-cost-model, provides the largest performance gain per occupied space on the primary storage medium if it is added to the first set
cannot be added because the total space occupied by all added columns would exceed the total space available on the primary storage medium, at least one column that
has not been added in a previous iteration and
that fits into the remaining space on the primary storage medium
is added to the first set.

Figure 6:
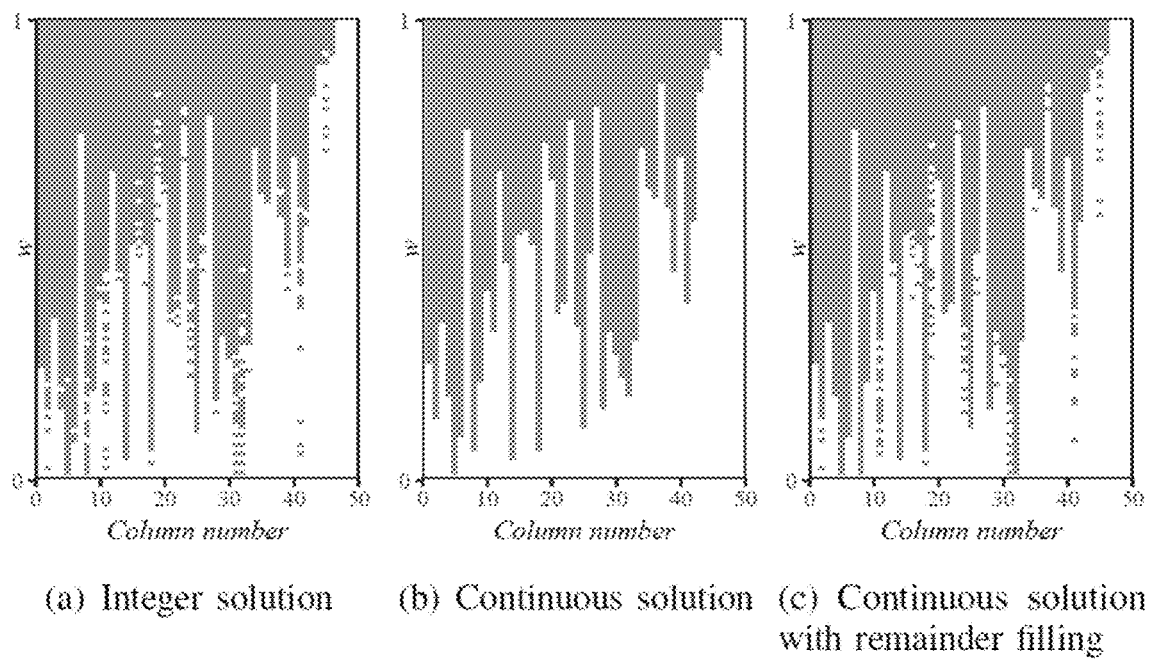
FIG. 6 is a graph that shows column selections (integer, continuous, and continuous with filling) for varying primary storage budgets, $w \in [0, 1]$. The graph indicates whether a column is in primary storage (shown blue, $x_i=1$, $i=1, \ldots, 50$) for Example 1.

The previous two embodiments bring about the advantage that no computationally expensive solver needs to be applied to obtain a solution to the column allocation problem. This can be appreciated in view of FIG. 6, which shows optimal allocations obtained by solving the performance-cost model using a solver. FIG. 6(a) shows the column allocation according to the integer solution for different w values. FIG.

6(b) shows the column allocation according to the continuous solution. While the column allocations according to the integer problem are quite complex and irregular, the column allocations according to the continuous allocation has a regular, recursive structure.

Remark 1. Consider problem (6): If a column i, i=1, ..., N, is allocated to primary storage for a budget A=A (α), A≥0, then column i is also allocated to primary storage allocations for all larger budgets Ã>A. Consequently, solutions of problem (6) have a recursive structure and columns are assigned to an optimal allocation in a fixed order.

The order of columns described in Remark 1 may be referred to as "performance order", which allows for ordering the set of columns according to their impact on reducing runtime. Note that the continuous solution can be further improved. FIG. 6(c) depicts the case, in which for a given budget A(w) the remaining space on the primary storage medium for a solution according to the continuous model is filled with at least one column, preferably according to the performance order described above. This recursive allocation strategy with filling closely resembles the optimal integer solution (cf. FIG. 6(a)).

The following is a detailed example of how a solution to (6) can be computed without applying a computationally expensive solver. The key idea is to explicitly derive the performance order oi. The decision whether a column should be in the primary storage medium or not boils down to the question whether $x_i$ has a positive or negative effect on (6). Due to its structure, objective (6) can be written as $\Sigma_{i=1,...,N} c_i(x_i)+C_i$, where C is a constant. Collecting terms that depend on $x_i$, we obtain that $c_i$, i=1, ..., N, amounts to $$c_i(x_i):=a_i \cdot ((S_i+\alpha) \cdot x_i+\beta \cdot |x_i-y_i|) \quad (8)$$

Where, I=1, ..., N, $$S_i := \sum_{j=1,...,Q: i \in q_j} b_j \cdot (c_{mm} - c_{ss}) \cdot \prod_{k \in q_j: s_k | s_i} s_k$$

Hence, whether a selection of column i has a positive or negative effect on (6) depends on its effect On (8).

Theorem 2. (i) Pareto-optimal solutions of problem (6) that satisfy a given primary storage budget A can be calculated as follows: Include as many columns as possible in the primary storage in the order $o_i$, i=1, ..., N, with $S_i+\beta \cdot (1-2 y_i)<0$, defined by $$o_i:=|\{k=1, ..., N: S_k - 2 \cdot \beta \cdot y_k \leq S_i - 2 \cdot \beta \cdot y_i\}|$$

(ii) The structure described in Remark 1 generally holds.

(iii) In (i) columns are recursively chosen such that the additional runtime improvement per additional primary storage used is maximized.

Proof of (i) Considering (8), we distinguish the following four cases, i=1; : : : ; N:

If $y_i=0$ and $S_i+\alpha+\beta<0$ then (8) decreases in $x_i$.
If $y_i=0$ and $S_i+\alpha+>\beta \geq 0$ then (8) increases in $x_i$.
If $y_i=1$ and $S_i+\alpha-\beta<0$ then (8) decreases in $x_i$.
If $y_i=1$ and $S_i-+\alpha-\beta \geq 0$ then (8) increases in $x_i$.

Summarizing the four cases, we obtain that if, i=1, ..., N, $$S_i+\alpha+\beta \cdot (1-2 \cdot y_i)<0 \quad (9)$$

then (8) decreases in $x_i$ and $x_i^*=1$ is optimal else we obtain $x_i^*=0$. Hence, if α decreases then the left-hand side of (9) decreases as well and, in turn, one column i after another is included in primary storage. The order in which columns are included in primary storage coincides with the performance order oi (cf. Remark 1). Now, $o_i$ can be easily determined by comparing each column i's critical α value that puts the left-hand side of (9) equal to zero. The column with the smallest value $S_i-2 \cdot \beta \cdot y_i$ is the first column to be put in primary storage. Finally, the order $o_i$ allows computing Pareto-optimal solutions of (6) that are admissible for a given budget A.

Proof of (iii). Assume a column allocation $\vec{x}$ corresponds to a runtime of $F(\vec{x})$ (including reallocation costs). Selecting a new column i in primary storage ($x_i:=1$) reduces the value F by $c_i(1)-c_i(0)=a_i \cdot (S_i+\beta \cdot (1-2 y_i))$ (cf. (8)) while the primary storage budget used increases by $a_i$. Note, the strategy defined in Theorem 2 (i) combines two advantages: Allocations are necessarily Pareto-optimal and can be computed as fast as simple heuristics (cf. (H1)-(H3)) since no penalty values a are needed anymore.

Remark 2. The result of Theorem 2 (i) can be combined with a filling heuristic: Include columns in primary storage that are of highest importance, cf. $o_i$. If a column does not fit into the primary storage budget A anymore, it is checked if columns of higher order do so, cf. FIG. 6(c).

The allocation strategy described in Theorem 2 (iii) reveals a general solution principle to approach the challenging problem of identifying the key columns that have the most impact.

Remark 3. We propose the following recursive heuristic: Columns are subsequently selected such that the "additional performance", in accordance with the performance cost model, per "additional primary storage used" is maximized.

Remark 3's heuristic allows to approximate Pareto-optimal combinations of performance and primary storage budget. This approach is effective as the efficient frontier is naturally characterized by a convex shape, see FIGS. 4 and 5, since the value of an additional unit of primary storage is decreasing with the memory budget (diminishing marginal utility). This principle can be adapted to compute optimized allocations for more general column allocation problems with highly complex (for instance, non-linear) scan cost functions. Moreover, the approach can also be applied if a query optimizers' what-if component is used as it similarly allows to estimate and to compare the relative performance improvements of specific column selections.

According to an embodiment, the database being a combined OLTP and OLAP database.

According to an embodiment, the primary storage medium is a DRAM medium.

According to an embodiment, the secondary storage medium not being a DRAM medium, According to an embodiment, the secondary storage medium being a SSD [solid state drive], HDD [hard disk drive], or any non-volatile storage.

According to an embodiment, at least one of the columns of the table is manually pinned to the first set and therefore excluded from the step of allocating the columns of the table to the first and the second set automatically on the basis of a performance-cost model.

According to an embodiment, the workload that the database has experienced during operation is determined based on historic workload data, in particular, using time series analysis. According to this embodiment the workload is determined based on historic workload data, i.e. the number of occurrences of different queries against the database system. Preferably, the workload only with a certain period in time is considered. Even more preferably, time series analysis is used. This is advantageous because the workload may change over time. It may even show a cyclical behaviour that could be taken into account.

According to an embodiment, the data of the columns allocated to the first set is dictionary compressed along columns.

According to an embodiment, the data of the columns allocated to the second set is uncompressed.

According to an embodiment, the primary-storage-resident columns remain dictionary-encoded while the remaining attributes are stored in a row-oriented and latency-optimized format on secondary storage. Preferably, each column of a tiered table is completely and solely stored in one single format without any replication or additional data structures.

According to an embodiment, the data of the columns allocated to the second set is page-wise compressed.

According to an embodiment, additional formats, such as disk-optimized column formats for secondary storage that allow scans for rarely filtered attributes, are provided in the database system. Alternatively, no additional formats are provided in the database system. The latter may be superior in an end-to-end consideration as it is better maintainable and does not add complexity to higher-level functionalities such as query optimization.

Specific Example Embodiment

According to a specific example embodiment of the disclosure, the database system is the Hyrise system. Hyrise is a hybrid main memory-optimized database for HTAP workloads. Preferably, each table in Hyrise consists of two partitions, a write-optimized delta partition (cf. C-Store's writable store) and a read-optimized main partition. Using an insert-only approach, data modifications are written to the delta partition, which is periodically merged into the main partition. Attributes in the main partition are dictionary-encoded with a bit-packed order-preserving dictionary. Attributes in the delta partition use an unsorted dictionary with an additional $B_+$-tree for fast value retrievals. ACID [atomicity, consistency, isolation, durability] compliance in Hyrise is implemented using multi-version concurrency control.

Hyrise is able to combine row- and column-oriented data layouts as well as horizontal and vertical partitioning in a free manner. While Hyrise's initial objective was to improve cache hit rates in the case of full DRAM residence, an objective of the present disclosure is to mitigate the negative performance impact of secondary storage. Preferably, a simplified hybrid format is used, which comprises column groups of variable lengths.

In the following, the performance of the specific example embodiment is described. All benchmarks have been executed on a four-socket Fujitsu Primergy RX4770 M3 with Intel Xeon E7-4850 v4 CPUs (16 cores per socket, 40M L3-Cache, 2.1 GHz), 2 TB of DRAM, running 64-bit Ubuntu 14.04 LTS with kernel 4.2. The inventors evaluated the following devices: CSSD: consumer-grade solid-state drive (Samsung SSD 850 Pro) with 256 GB storage capacity. ESSD: enterprise-grade SANDISK Fusion ioMemory PX600 SSD with 1 TB storage capacity. HDD: SATA-connected Western Digital WD40EZRX HDD with 4 TB storage capacity and 64 MB cache. 3D XPoint: 3D XPoint-based Intel Optane P4800X. Both solid-state drives are NAND devices which are widely used in modern data centers, whereas the ESSD is a bandwidth optimized device that reaches its top performance with large 10 queues. The 3D XPoint device is the first generation of solid-state drives that does not use a NAND architecture. This device is particularly interesting as it has 10 times lower random access latencies than NAND devices even for short 10 queues. The HDD device serves as a reference device. Due to its poor random access performance, the device is not included in the materialization measurements.

Benchmark Data Sets: The inventors evaluated the performance on three different data sets: (i) The SAP ERP data set which reflects characteristics (distinct counts, data types, etc.) of the BSEG table of the analyzed production SAP ERP system. The BSEG table is the central table of the financial module and has the highest analytical load in an SAP ERP system (20 M tuples with 345 attributes). (ii) The TPC-C data consists of the ORDERLINE table of the TPC-C benchmark with a scale factor of 3 000 (300 M tuples). (iii) The Synthetic data set is a table with 10 M tuples and 200 attributes which are filled with random integer values. Both BSEG and ORDERLINE tables belong to the largest tables of each system and are thus of special interest for our focus on cold data eviction. ORDERLINE and BSEG have vastly differing widths (10 vs. 345 attributes) and depict both extremes for the effect on tuple reconstruction in our implementation. Before discussing end-to-end performance, the modified components compared to vanilla Hyrise are briefly discussed. The inventors' data allocation model aims to keep all sequentially accessed columns in DRAM. Hence, analytical performance remains the same except from very tight DRAM budgets. But several components that potentially negatively impact the transactional performance of Hyrise have been modified.

Transaction Handling: Hyrise uses MVCC [multiversion concurrency control] to ensure concurrent and transactionally safe accesses the data. MVCC-related columns are kept unchanged and DRAM-allocated. Thus, transaction performance is not impacted.

Indices: To ensure high throughput for point accesses, Hyrise has several index structures such as single column $B_+$-trees and multi-column composite keys. Preferably, indices are not evicted and kept completely DRAM-allocated.

Data Modifications: Throughput and latency of modifications are not impacted, because by using an insert-only approach, modifications are handled by the delta partition which remains fully DRAM-resident (cf. Section II). However, the periodic process of merging the delta partition with the main partition is negatively affected. But since the merge process is asynchronous and non-blocking, ongoing transactions are neither blocked nor slowed down during the merge phase.

The inventors evaluated the performance of the present approach for TPC-C and the CH-benCHmark. Due to the unchanged transactional components, only reading queries are impacted. Hence, excluding the asynchronous merge phase, runtime performance depends largely on the given memory budget. For TPC-C's largest table ORDERLINE, 4 out of 10 columns are selected/aggregated leaving at least 6 columns to be evicted to disk. Probably not surprisingly given TPC-C's complexity, the present data allocation model separates ORDERLINE into the four primary key attributes as primary-storage-resident columns (PSRCs) and the remaining attributes into a secondary storage column group (SSCG). Table III shows the relative performance impact of TPC-C's delivery transaction and CH-query #19.

While the performance results for TPC-C are promising, please note that TPC-C's workload and data model are simple and no performance-critical path accesses tiered data. The same is partially true for the CH-benCHmark that accesses ORDERLINE mainly for grouping, filtering, and joining on (non-tiered) primary key columns. More interesting is CHquery #19 which filters on a non-primary-key column. Given a DRAM budget of w=0.2, only the primary key columns of ORDERLINE remain DRAM-resident and even analytically accessed columns would be evicted as part of an SSCG. For query #19, the join predicate on ol_i_id and the predicate on ol_w_id are not impacted, but the range predicate on ol_quantity is executed on a tiered column. For a warehouse count of 100, Hyrise probes ol_quantity with a selectivity of 0.05. In the configuration shown in Table III, the probing alone is slowed down by a factor of 40 which leads to an overall query slowdown of factor 6.7. If we allow for a larger DRAM budget of w=0.4, columns ol_delivery_d and ol_quantity become DRAM-resident lowering the slowdown to 1.12, which may be attributed to the narrow materialization of ol_amount (SSCG-placed). The remainder of this section studies the three access patterns that have been altered in our prototypical implementation: (i) random accesses for wide tuple reconstructions, (ii) sequentially scanning a tiered column, and (iii) probing a tiered column.

Figure 7:
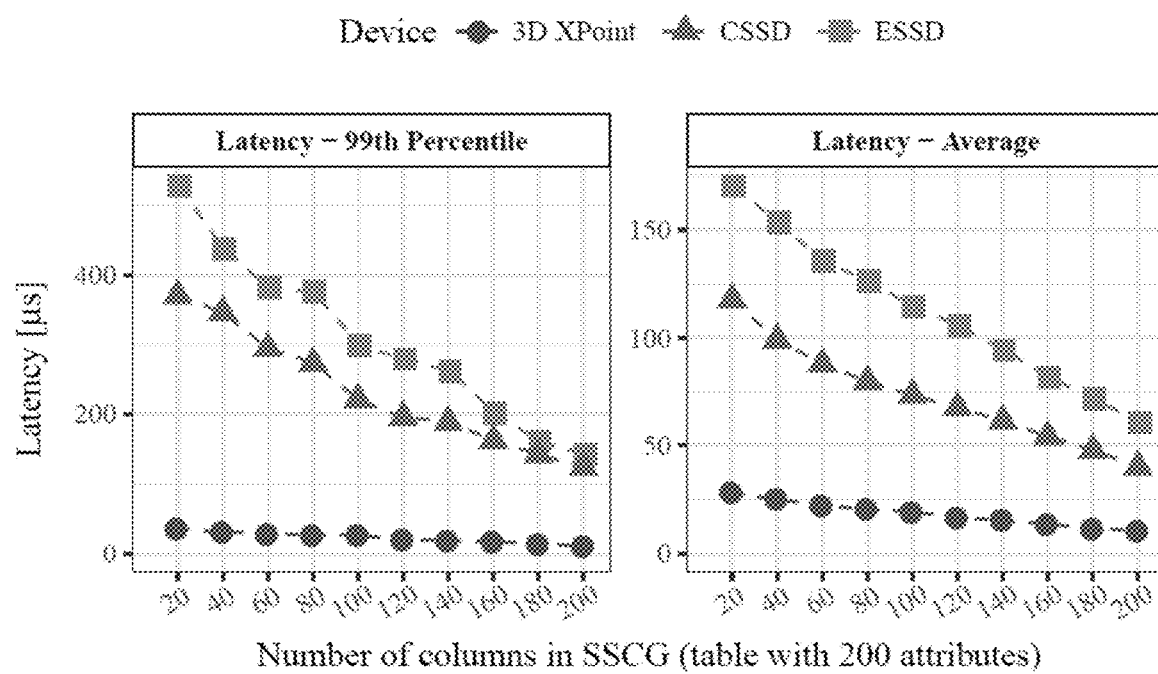
FIG. 7 is a graph that shows latencies for full-width tuple reconstructions on synthetic data set (uniformly distributed accesses).
Figure 8:
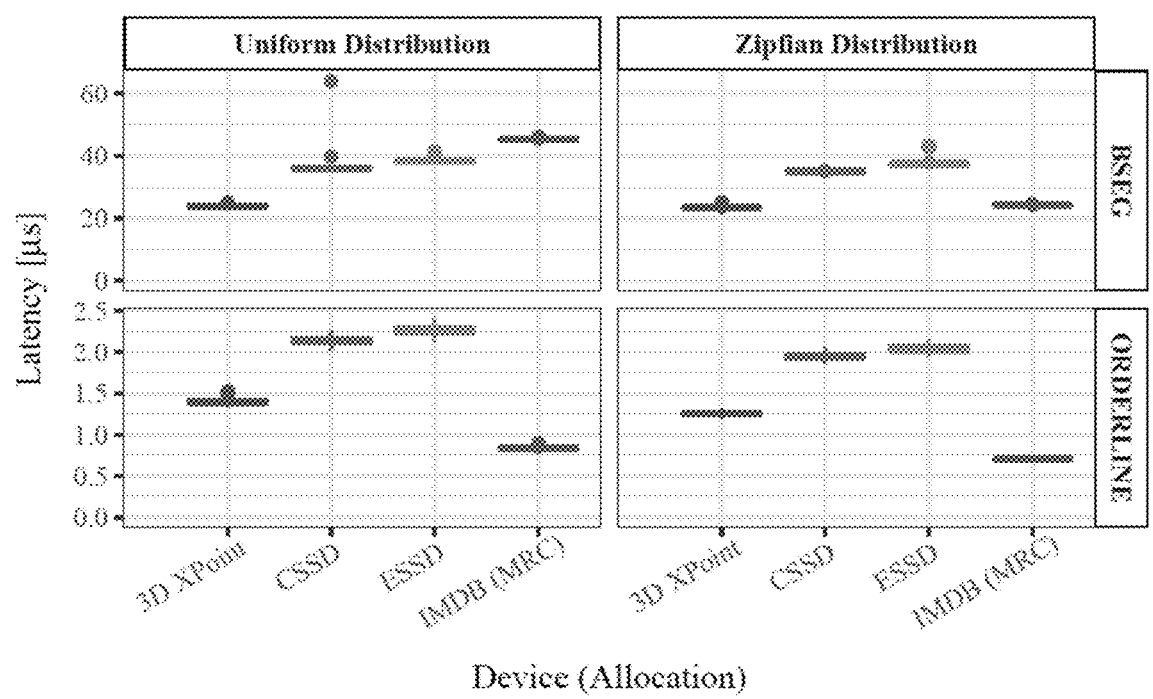
FIG. 8 is a latency box plot for full-width tuple reconstructions on tables ORDERLINE and BSEG (uniform- and zipfian-distributed accesses).

The inventors' main focus with respect to tiering performance is the latency of wide tuple reconstructions. Especially for column stores, wide tuples reconstructions are expensive as each attribute materialization potentially leads to two L3 cache misses (access to value vector and dictionary). The inventors measured reconstruction performance by accessing randomly chosen tuples using a uniform random distribution. The inventors set the page cache to 2% of the evicted data size and disable page pinning. The uniform distribution of accesses reflects the worst case scenario for our implementation with almost no cache hits during tuple reconstruction. The inventors measure the mean latency as well as the 99th percentile latency of full-width tuple reconstructions on the synthetic data set. The inventors vary the number of attributes stored in the SSCG from 20 to 200. For each benchmark, the inventors execute 10 M tuple reconstructions. The results are shown in FIG. 7. For the uniformly distributed accesses, the inventors observe that the latency-optimized 3D XPoint device outperforms the NAND devices. This trend is even more nuanced when comparing the 99th percentile latencies. Most notably, SSCG-placed tuples on 3D XPoint outperform fully DRAM-resident dictionary-encoded tuples when 50% of the attributes are stored in the SSCG. The second benchmark evaluates tuple reconstructions for BSEG and ORDERLINE tables with zipfian (scale=1) and uniformly distributed accesses, shown in FIG. 8. IMDB (PSRC) denotes a columnar, dictionary-encoded, and fully DRAM-resident data schema. The BSEG table consists of 20 PSRC attributes and 325 attributes in an SSCG (ORDERLINE: 4 PSRC and 6 attributes in SSCG). The results show that runtimes are dominated by the width of the SSCG with an increasingly lower latency the higher the share of SSCG-placed attributes gets. The tiered uncompressed column group (SSCG) is able to compensate the negative performance impact of accessing secondary storage. It can even outperform full DRAM-resident cases since non-local DRAM accesses (twice per attribute due to dictionary-encoding) quickly sum up for wide tables. For wide tables such as the BSEG table, the performance improves up to factor 2 for uniform accesses and 1.1 for zipfian accesses. For the narrow ORDERLINE table, performance degrades by 70% for uniform accesses.

Figure 9:
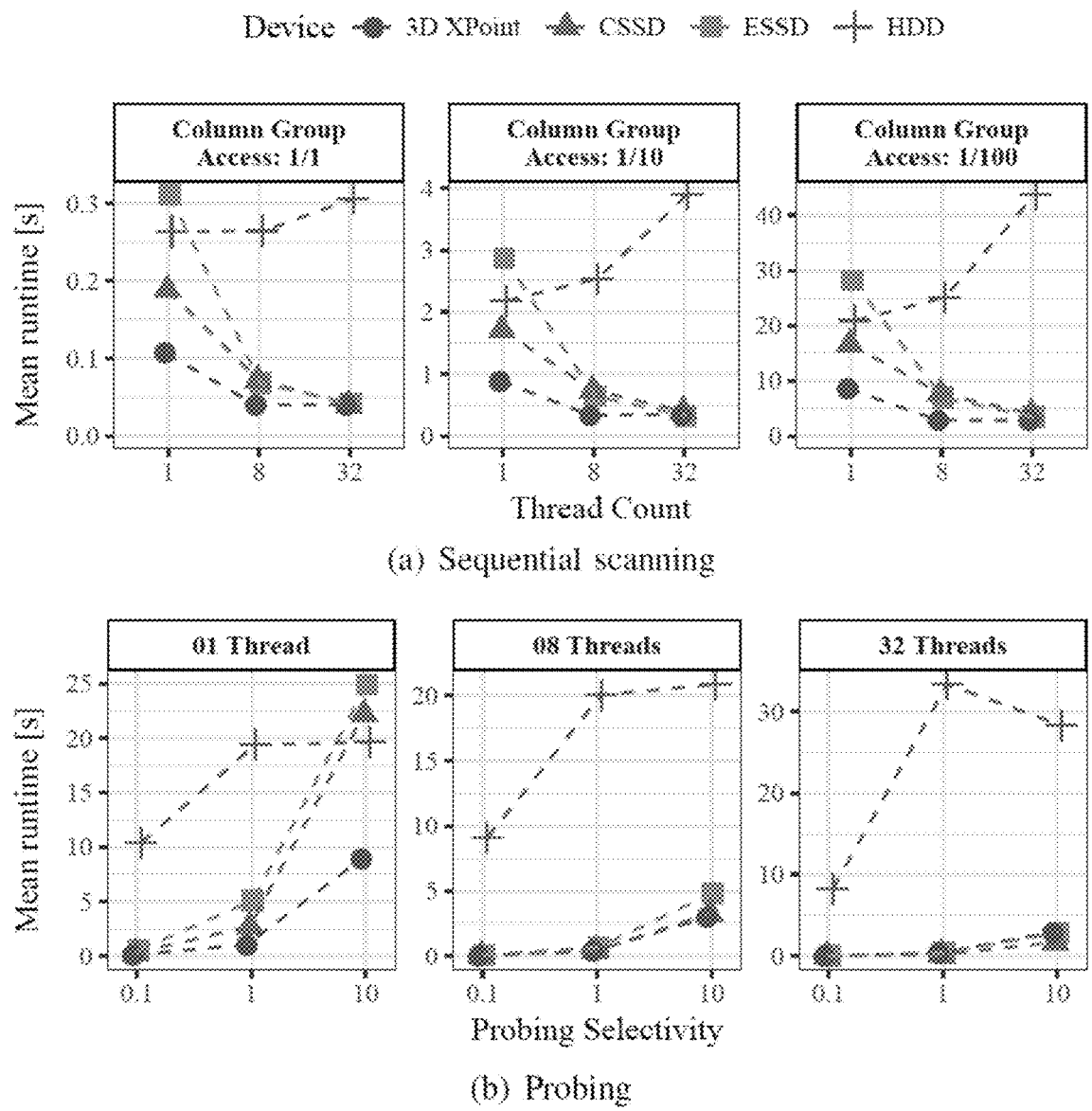
FIG. 9 is a graph that shows runtime performance of sequential access patterns.

To evaluate the impact on analytical workloads, the inventors measure the performance of sequential scans and probing. Scanning: An important assumption of our approach is that the vast majority of sequential processing remains on DRAMallocated attributes (see Section III for column selection and pinning). In case the workload is well known and does not change significantly, sequential processing is expected to never access secondary storage. As columns that are not tiered remain unmodified, the performance remains the same. Nonetheless, unexpected workloads patterns or very low DRAM budgets pose performance problems. They might still occur due to (i) exceptional or seasonal queries or (ii) changing workload patterns that have not yet resulted in an adapted data placement. FIG. 9(a) shows the performance of column scans with varying thread counts and widths of the SSCG. A column group access of 1/1 means that one attribute in an SSCG that contains a single attribute was scanned. 1/100 means that one attribute out of 100 in an SSCG was scanned. As expected, the costs scale linearly with the width of SSCG. The reason is the effective data that is read with each single 4 KB page access. With 100 integer columns, each 4 KB page contains 10 values to scan while each page for an SSCG of 10 attributes contains 100 values to scan. HDDs perform well for pure sequential requests but significantly slow down with concurrent requests by multiple threads while modern SSDs require concurrent access/larger 10 queues for full performance. Probing: FIG. 9(b) shows the probing performance. Due to our data placement model, one expects probing to happen infrequently on tiered attributes, but more frequently than scanning. Again, thread count has a significant impact on the performance of NAND devices as does the selectivity. Table IV lists the relative slowdown comparing the measurements discussed before (cf. FIGS. 9(a) and 9(b)) with a full DRAM-resident and dictionary-encoded columnar system.

As expected, tuple reconstructions can be sped up, depending on the number of columns accessed and their storage tier. Sequential accesses slow down linearly with the number of attributes stored in the SSCG. Due to non-sequential access pattern, HDDs perform clearly worse probing than scanning.

Figure 2:
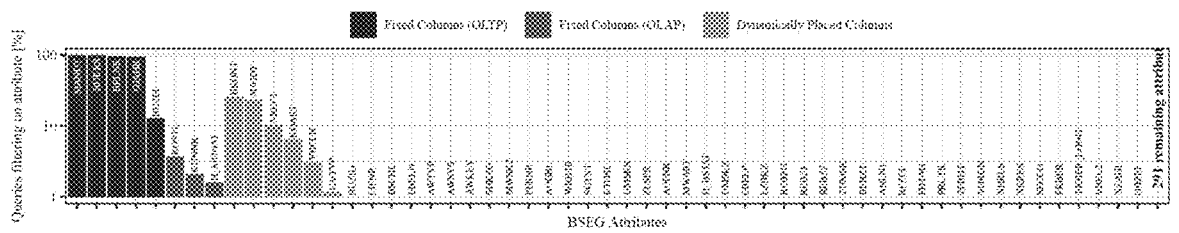
FIG. 2 is a graph that shows the attributes of table BSEG of a production SAP ERP [enterprise resource planning] system and their filter frequencies. (BSEG stands for Accounting Document Segment, a standard table in SAP ERP systems.) 291 attributes have not been filtered at all and will thus be evicted to secondary storage. The first two groups show pinned attributes (e.g., primary key attributes for OLTP) while the allocation of the remaining attributes will be decided by the column selection solution.

The evaluation of an SAP ERP system shows that usually between 5-10% of the attributes are accessed for sequential operations, while the inventors' prototype with SSCG-placed attributes outperforms the fully DRAM-resident counterpart as soon as more than 50% of the attributes are stored in the SSCG (cf. FIG. 2). SSCGs can compensate the performance impact of secondary storage access. Tiering SSCGs therefore is worth the added complexity in Hyrise. As long as the workload is known and not frequently changing, performance can be improved while reducing memory footprints. But in case of recurring analytical queries on SSCG-placed attributes, the only feasible approach from a performance perspective is to load the columns back into DRAM as PSRCs.

Advantageously, the present disclosure allows for scalability. Enterprise systems often have thousands of tables. For those systems, it is unrealistic to expect that the database administrator will set memory budgets for each table manually. Our presented solution is able to determine the optimal data placement for thousands of attributes. The inventors measured the solution runtime for a large synthetic data set with a varying number of queries and attributes using the MOSEK solver. Table II compares the computation time of the integer model and the explicit solution in the setting of Example 1 for different numbers of columns N and queries Q. Table II shows that optimized data placements can be efficiently calculated, even for large systems. The linear problem is manageable for state-of-art integer solvers. However, runtimes can become large when the size of the system is large. 4MOSEK Solver: https://www.mosek.com The explicit solutions (cf. Theorem 2) have been computed locally using a simple single-threaded C++ implementation. As expected, the computation of the explicit solution is orders of magnitudes faster and allows for immediate response. Hence, it becomes easy for a database administrator to (i) dynamically update optimized allocations and (ii) decide whether it is worth to allow for a slightly larger budget compared to the expected additional performance.

TABLE I

ACCESS STATISTICS OF A PRODUCTION SAP ERP SYSTEM

| Table | Attribute count | Attributes filtered | Attributes filtered in ≥1‰ of queries |
|---|---|---|---|
| BSEG | 345 | 50 | 18 |
| ACDOCA | 338 | 51 | 19 |
| VBAP | 340 | 38 | 9 |
| BKPF | 128 | 42 | 16 |
| COEP | 131 | 22 | 6 |

TABLE II

RUNTIME COMPARISON OF COLUMN SELECTION

| Column Count | Query Count | Mean Runtime Integer Solution | Mean Runtime Explicit Solution |
|---|---|---|---|
| 100 | 1 000 | 0.01 s | 0.001 s |
| 500 | 5 000 | 0.13 s | 0.01 s |
| 1 000 | 10 000 | 0.32 s | 0.01 s |
| 5 000 | 50 000 | 6.74 s | 0.03 s |
| 10 000 | 100 000 | 27.4 s | 0.07 s |
| 20 000 | 200 000 | 113.6 s | 0.15 s |
| 50 000 | 500 000 | 2210.3 s | 0.48 s |

TABLE III

PERFORMANCE IMPACT ON TPC-C'S DELIVERY TRANSACTION AND Q19 OF CH-BENCHMARK (3D XPOINT)

| | Data Evicted | Slowdown |
|---|---|---|
| TPC-C Delivery | 80% | 1.02x |
| CH-query #19 | 80% | 6.70x |
| CH-query #19 | 63% | 1.12x |

TABLE IV

PERFORMANCE OF ANALYTICAL ACCESS PATTERNS: COMPARING SSCG ON 3D XPOINT VS. DRAM-RESIDENT MRC (32 THREADS). SHOWING RELATIVE SLOWDOWN (latency SSCG/latency MRC)

| | 1 Thread | 8 Threads | 32 Threads |
|---|---|---|---|
| Uni. Tuple Rec. (100/200) | 1.02 | 0.92 | 0.86 |
| Uni. Tuple Rec. (180/200) | 0.81 | 0.72 | 0.64 |
| Zipf. Tuple Rec. (100/200) | 0.92 | 0.83 | 0.77 |
| Zipf. Tuple Rec. (180/200) | 0.75 | 0.67 | 0.60 |
| Scanning (1/100) | 335.69 | 644.44 | 548.85 |
| Probing (1/100, 0.1%) | 5447.11 | 301.89 | 78.95 |
| Probing (1/100, 10%) | 4446.25 | 1195.00 | 987.50 |

TABLE V

Notation Table

| Workload | |
|---|---|
| $i$ | $1, \ldots, N$, N the number of columns |
| $j$ | $1, \ldots, Q$, Q the number of queries |
| $a_i$ | size of column i, $i = 1, \ldots, N$ |
| $s_i$ | selectivity of column i, $i = 1, \ldots, N$ (i.e., average share of tuples with same value) |
| $q_j$ | columns used by query j, $j = 1, \ldots Q$, subset of $\{1, \ldots, N\}$, e.g., $q_1 = \{8, 6, 13, 14.87\}$ |
| $b_j$ | frequency of query j, $j = 1, \ldots, Q$ |
| $g_i$ | number of queries j in a workload that include column i, i.e., $g_i := \sum_{j=1,\ldots,Q, i \in q_j} b_j, i = 1, \ldots, N$ |
| $f_j$ | scan costs of query j, $j = 1, \ldots, Q$ |
| $c_i$ | coefficients of the transformed objective, $i = 1, \ldots, N$ |
| $S_j$ | auxiliary parameter, $j = 1, \ldots, Q$ |
| $o_i$ | optimized order of columns i, $i = 1, \ldots, N$ |
| Cost Parameters | |
| $c_{mm}$ | scan cost parameter main memory |
| $c_{ss}$ | scan cost parameter secondary storage |
| $\alpha$ | cost parameter for DRAM used |
| $\beta$ | cost parameter for reallocation |
| A | DRAM budget |
| w | share of total size of columns allowed in DRAM |
| Variables | |
| $x_i$ | decision variables: column in DRAM yes (1) / no (0), $i = 1, \ldots, N$, and allocation vector $\vec{x} = (x_1, \ldots, x_N)$ |
| $F(\vec{x})$ | total scan costs of allocation $\vec{x}$ |
| $M(\vec{x})$ | required DRAM budget of allocation $\vec{x}$ |
| $y_i$ | given initial/current state for $x_i$, $i = 1, \ldots, N$ |
| $z_i$ | auxiliary variable for linearization, $i = 1, \ldots, N$ |

The invention claimed is:

1. Computer-implemented method for allocating columns of a table stored in a database system into at least two sets of columns, a first set and a second set,
   the data of the columns allocated to the first set being stored on a primary storage medium using a column-oriented data structure and
   the data of columns allocated to the second set being stored on a secondary storage medium using a row-oriented data structure,
   characterized in that
   the method comprises the step of
   allocating the columns of the table to the first and the second set autonomously on the basis of a performance-cost model
   wherein the step of allocating the columns comprises the step of:
   iteratively adding columns to the first set so that, in each iteration, a column is added to the first set that has not been added in a previous iteration and that, in accordance with the performance-cost model, provides the largest performance gain per occupied space on the primary storage medium if it is added to the first set.

2. Method according to claim 1, wherein the step of allocating the columns is carried out repeatedly during operation of the database.

3. Method according to claim 1, wherein the performance-cost model takes into account at least one of the following parameters:
   an execution time of a workload that the database has experienced during operation, the execution time preferably taking into account successive columnar filtering; and
   a total available space on the primary storage medium.

4. Method according to claim 3, wherein the performance-cost model further takes into account costs for reallocating columns.

5. Method according to claim 1, wherein the step of assigning the columns further comprises the step of:
if the column that
has not been added in a previous iteration and that,
in accordance with the performance-cost model, provides the largest performance gain per occupied space on the primary storage medium if it is added to the first set
cannot be added because the total space occupied by all added columns would exceed the total space available on the primary storage medium, a column that
has not been added in a previous iteration and
that fits into the remaining space on the primary storage medium is added to the first set.

6. Method according to claim 1,
the database being a combined OLTP and OLAP database,
the primary storage medium being a DRAM medium,
the secondary storage medium not being a DRAM medium, and
the secondary storage medium being at least one of a SSD, a HDD, and a non-volatile storage.

7. Method according to claim 1, wherein at least one of the columns of the table is manually pinned to the first set and therefore excluded from the step of allocating the columns of the table to the first and the second set autonomously on the basis of a performance-cost model.

8. Method according to claim 1, wherein the workload that the database has experienced during operation is determined based on historic workload data, in particular, using time series analysis.

9. Method according to claim 1, wherein the data of the columns allocated to the first set is dictionary compressed along columns.

10. Method according to claim 1, wherein the data of the columns allocated to the second set is uncompressed.

11. Method according to claim 1, wherein the data of the columns allocated to the second set is page-wise compressed.

12. Database system configured to carry out a method according to claim 1.

13. Non-transitory computer readable medium storing a computer program that when executed by a processor controls a database system to carry out a method according to claim 1.

* * * * *